United States Patent
Ando et al.

(10) Patent No.: US 8,837,267 B2
(45) Date of Patent: Sep. 16, 2014

(54) METHOD FOR RECORDING AND REPRODUCING A HOLOGRAPHIC READ ONLY RECORDING MEDIUM, AND HOLOGRAPHIC READ ONLY RECORDING MEDIUM

(75) Inventors: Toshio Ando, Kitakyushu (JP); Takehiro Shimizu, Kitakyushu (JP); Kazuyoshi Masaki, Kitakyushu (JP)

(73) Assignee: Nippon Steel & Sumikin Chemical Co., Ltd., Tokyo (JP)

( * ) Notice: Subject to any disclaimer, the term of this patent is extended or adjusted under 35 U.S.C. 154(b) by 133 days.

(21) Appl. No.: 13/054,368

(22) PCT Filed: Jul. 17, 2009

(86) PCT No.: PCT/JP2009/062947
§ 371 (c)(1),
(2), (4) Date: Feb. 17, 2011

(87) PCT Pub. No.: WO2010/008064
PCT Pub. Date: Jan. 21, 2010

(65) Prior Publication Data
US 2011/0134741 A1    Jun. 9, 2011

(30) Foreign Application Priority Data

Jul. 18, 2008  (JP) ................. P2008-187546

(51) Int. Cl.

| | |
|---|---|
| G11B 7/00 | (2006.01) |
| G11B 7/26 | (2006.01) |
| G03H 1/02 | (2006.01) |
| G11B 7/245 | (2006.01) |
| G11B 7/24024 | (2013.01) |
| G11B 7/0065 | (2006.01) |
| G11B 7/24044 | (2013.01) |
| G11B 7/007 | (2006.01) |
| G11B 7/085 | (2006.01) |

(52) U.S. Cl.
CPC .............. *G03H 1/02* (2013.01); *G11B 7/24044* (2013.01); *G03H 2250/42* (2013.01); *G11B 7/26* (2013.01); *G03H 1/0256* (2013.01); *G11B 7/245* (2013.01); *G11B 7/00772* (2013.01); *G11B 7/24024* (2013.01); *G11B 7/0065* (2013.01); *G11B 7/08564* (2013.01)
USPC .......................................................... 369/103

(58) Field of Classification Search
USPC .......................................................... 369/103
See application file for complete search history.

(56) References Cited

U.S. PATENT DOCUMENTS

| | | | | |
|---|---|---|---|---|
| 7,321,541 | B2 * | 1/2008 | Horimai ........................ | 369/103 |
| 2005/0180291 | A1 * | 8/2005 | Ogasawara ................... | 369/103 |

(Continued)

FOREIGN PATENT DOCUMENTS

| | | |
|---|---|---|
| JP | 2001-215334 | 8/2001 |
| JP | 2005-266609 | 9/2005 |

(Continued)

OTHER PUBLICATIONS

Holographic Data Storage Media Employing Phase-Change Reflector by Toshio Ando et al.; Japanese Journal of Applied Physics, vol. 46, No. 6B, 2007; pp. 3855-3857.

(Continued)

*Primary Examiner* — Brenda Bernardi
(74) *Attorney, Agent, or Firm* — Sturm & Fix LLP

(57) ABSTRACT

A recording signal beam and a recording reference beam are irradiated onto a first surface of a holographic recording medium to write an information as an interference pattern therein. Next, a reflective layer is provided on a second surface opposite to the first surface of the holographic recording medium such that the reflective layer is adhered with the second surface, and a reproducing reference beam is irradiated onto the first surface of the holographic recording medium so as to read a signal beam which is reflected at the reflective layer and reproduced from the holographic recording medium.

8 Claims, 6 Drawing Sheets

(56) References Cited

U.S. PATENT DOCUMENTS

2007/0013985 A1 1/2007 Chuang et al.
2007/0047419 A1* 3/2007 Usami .......................... 369/103
2007/0242321 A1* 10/2007 Mizushima et al. .............. 359/3
2007/0243472 A1 10/2007 Ando et al.

FOREIGN PATENT DOCUMENTS

| JP | 2005283618 | | 10/2005 |
|---|---|---|---|
| JP | 2006-235364 | | 9/2006 |
| JP | 2006-343431 | | 12/2006 |
| JP | 2006343431 A | * | 12/2006 |
| JP | 2007248595 | | 9/2007 |
| JP | 2008-116896 | | 5/2008 |

OTHER PUBLICATIONS

Multiplexing Characteristics of Holographic Recording Media Employing Phase-Change Reflector by Toshio Ando, et al.; ISOM, '07 Tech. Dig-, Th-K-03, 2007.

* cited by examiner

METHOD FOR RECORDING AND REPRODUCING A HOLOGRAPHIC READ ONLY RECORDING MEDIUM, AND HOLOGRAPHIC READ ONLY RECORDING MEDIUM

TECHNICAL FIELD

The present invention relates to a method for recording and reproducing a holographic read only recording medium configured such that an information is to be recorded and reproduced by using holographic technique and a holographic read only recording medium.

BACKGROUND ART

The writing process for a holographic recording medium is implemented by irradiating a signal beam with a superimposed image information and a reference beam onto a recording layer so as to record the image information as an interference pattern. The reading process for the holographic recording medium is implemented by irradiating the reference beam onto the recording layer where the image information is written so as to read the image information out.

In the holographic data storage, the image information can be recorded and read out as one page and thus at one time per page so that a plurality of pages relating to respective image informations can be multiply recorded in the same area of the recording layer of a holographic recording medium. Therefore, the holographic recording technique is a promising candidate for a next-generation optical disc technology with a high data transfer rate and a large capacity which can be substituted for a conventional bit-by-bit data storage technology which is employed in conventional CDs, DVDs and Blu-ray Discs.

The holographic recording medium can be largely classified in a transmission-type holographic medium and a reflection-type holographic medium. In the transmission-type holographic medium, an optical beam is passed through the holographic medium with no reflective layer so as to conduct the recording and reproducing process. In the reflection-type holographic medium, an optical beam is reflected at a reflective layer provided for the holographic medium so as to conduct the recording and reproducing process.

Moreover, the transmission-type holographic medium can be classified into two types of holographic media. In one transmission-type holographic medium, a signal beam and a reference beam are irradiated onto a holographic recording medium from the same side thereof for recording and the reference beam is irradiated onto the recorded area of the holographic recording medium so that the thus holographically diffracted beam can be passed through the holographic medium for reproducing (belonging to the transmission-type hologram on holographic classification). In the other transmission-type holographic medium, a signal beam and a reference beam are irradiated onto a holographic recording medium from the opposite side thereto for recording and the reference beam is irradiated on the recorded area of the holographic recording medium so that the thus holographically diffracted beam can be reflected from the holographic medium for reproducing (belonging to the reflection-type hologram on holographic classification).

In such a transmission-type holographic medium, a reference beam can be irradiated onto the recorded area of the holographic medium for reproducing from the side opposite to the side where the signal beam and the reference beam are irradiated onto the holographic medium for recording. In this case, the thus obtained reproduced signal can be rendered an optical signal of phase conjugation. This reproducing process is called as "phase-conjugate reproduction" whereby the optical distortion, typified by the lens aberration, in the optical components of the optical system can be almost cancelled at the reproducing process. Therefore, the reproducing process becomes efficient particularly as a reproducing means for reproducing an image information with a higher S/N ratio under the condition of low distortion. In the use of the transmission-type holographic medium, since the corresponding recording/reproducing optical systems are required to be positioned at both sides of the holographic medium in both of the transmission-type hologram and the reflection-type hologram, the total recording/reproducing optical system becomes a largely scaled and complicated one.

In such a reflection-type holographic medium, on the other hand, the corresponding recording/reproducing optical system is required to be positioned at either side of the holographic medium, the total recording/reproducing optical system becomes a small scaled and simplified one. In this point of view, it is advantageous to employ the reflection-type holographic medium in the case where the holographic recording technology is applied for optical discs. In the reflection-type holographic medium, however, some optical beams with noise superimposed thereto may be generated due to the reflection beams in both of the recording process and the reproducing process so that the treatment of the optical beams with noise become one of the problems to be solved. The holographic medium and the recording/reproducing method to solve such a problem are proposed in Patent document No. 1 and Non-patent document No. 1.

Patent document No. 1 teaches a holographic reproducing technique where a reflective layer is formed on a main surface of a holographic recording medium to which a recording signal beam and a recording reference beam are to be irradiated, and a reproducing reference beam is irradiated on the other main surface of the holographic recording medium with no reflective layer.

Moreover, Non-patent document No. 1 teaches a holographic recording medium where a phase-change layer and a holographic recording layer are subsequently stacked. In the implementation of the holographic recording process, the phase-change layer is rendered amorphous so as to lower the reflectivity and in the implementation of the holographic reproducing process, the phase-change layer is rendered crystalline so as to increase the reflectivity. In this case, the formation of unnecessary diffraction grating can be reduced, resulting in the provision of the holographic recording medium with a high S/N ratio and a large multiplexing number.

PRIOR ART DOCUMENT

Patent Document

Patent Document No. 1: JP-A 2006-235364 (KOKAI)
Patent Document No. 2: JP-A 2008-116896 (KOKAI)
Non patent document No. 1: T. Ando, et al: Jpn. J. Appl. Phys. 46, 6B (2007) 3855
Non patent document No. 2: T. Ando, et al: ISOM'07 Tech. Dig., Th-K-03 (2007)

DISCLOSURE OF THE INVENTION

Problem to be Solved by the Invention

In the holographic reproducing technique where the reflective layer is formed on the main surface of the holographic recording medium to which the recording signal beam and the recording signal beam are to be irradiated, and the reproducing reference beam is irradiated on the other main surface of the holographic recording medium away from the reflective layer as taught in Patent document No. 1, the reproducing reference beam reciprocates in the substrate of the holographic recording medium by the reflective layer. In a normal optical recording, the thickness of the substrate to be used for the corresponding optical medium is set to 500 μm or more in order to ensure the stiffness and strength of the optical medium.

Here, when the reproducing reference beam is irradiated onto the holographic recording medium at a predetermined incident angle, the incident position of the reproducing reference beam may be shifted from the inherent incident position of the reproducing reference beam in the holographic recording area. It is possible to compensate the incident position of the reproducing reference beam by the prior calculation for the degree of shift, but the compensation requires a compensation mechanism, resulting in the complexity and complication of the reproducing process.

In the holographic recording medium as taught in Nonpatent document No. 1, on the other hand, since the phase-change reflective layer is almost adhered to the holographic recording layer, the above-mentioned problem can be eliminated. In the recording process, however, since the reflectivity of the phase-change reflective layer is about 4% even at amorphous state, the holographic recording medium is exposed by the reflective beam from the phase-change reflective layer at amorphous state.

Supposed that the intensity of an incident beam and the intensity of a reflective beam are designated by "Ii" and "Ir", respectively, the relation of Ir=0.04·Ii is realized when the reflectivity is set to 4%. On the other hand, supposed that the amplitude of the incident beam and the amplitude of the reflective beam are designated by "Ai" and "Ar", respectively, the relation of Ar=0.2·Ai is realized because the relation of Ii=Ai$^2$ and the relation of Ir=Ar$^2$ are satisfied. Supposed that in the interference pattern formed by the incident beam and the reflective beam, the maximum amplitude of the interference pattern and the minimum amplitude of the interference pattern are designated by "Amax" and "Amin", respectively, and the maximum intensity of the interference pattern and the minimum intensity of the interference pattern are designated by "Imax" and "Imin", respectively, the following relations are realized:

$$A\max=Ai+Ar=1.2\cdot Ai$$

$$A\min=Ai-Ar=0.8\cdot Ai$$

$$I\max=A\max{}^2=1.44\cdot Ii$$

$$I\min=A\min{}^2=0.64\cdot Ii$$

As a result, the interference pattern is formed by two times or more large difference in intensity.

Therefore, since the holographic recording layer is exposed by the reflective recording signal beam and the reflective recording reference beam which are reciprocated at the reflective layer in addition to the incident recording signal beam and the incident recording reference beam, the unnecessary exposure for the recording layer results in being conducted. In this point of view, the enhancement in noise reduction, S/N ratio and multiplexing number of the holographic recording medium is limited.

Moreover, since the reflectivity of the phase-change reflective layer is only about 30% even at crystalline state, the enhancement of the reproduced signal beam is limited so that the enhancement in S/N ratio and data transfer rate of the holographic recording medium is also disturbed.

Furthermore, since the phase-change reflective layer is required to be constituted from at least four layers, i.e., a total reflection layer, a first dielectric layer, a phase-change layer and a second dielectric layer, the layer structure of the phase-change reflective layer becomes complicated and thus the manufacturing process of the phase-change reflective layer also becomes complicated.

Prior to the reproducing process of the holographic recording medium, the phase-change layer must be crystallized in order to increase the reflectivity thereof. The crystallization can be implemented by increasing the temperature of the phase-change layer to the crystallization temperature thereof or more and cooling the phase-change layer slowly. Since the crystallization temperature is about 200° C., only the phase-change layer must be increased efficiently in temperature under the condition of no thermal damage for the holographic recording layer and the like. In the case where the holographic recording medium is formed in a shape of disc, it is required that a laser beam must be scanned on the holographic recording medium at a predetermined laser power and at a predetermined velocity from a specific device such as an initializing device, which is used before phase-change type optical discs are shipped, also resulting in the complication of the manufacturing process of the holographic recording medium.

In the case where the holographic recording medium is not formed in a shape of disc, a newly designed device must be manufactured for the realization of phase-change, also resulting in the complication of the manufacturing process of the holographic recording medium.

In view of the aforementioned problems, therefore, it is an object of the present invention to easily provide a simply structured holographic recording medium which can prevent unnecessary exposure and the formation of unnecessary interference pattern in the holographic recording layer at recording, realize a large multiplexing number under the condition of low noise at recording, and implement the reproducing process at a high S/N ratio and a high data transfer rate.

Technical Solution

In order to achieve the object of the present invention, the present invention relates to a method for recording and reproducing a holographic read only recording medium, including the steps of: irradiating a recording signal beam and a recording reference beam onto a first surface of a holographic recording medium to write an information as an interference pattern therein; providing a reflective layer on a second surface opposite to the first surface of the holographic recording medium such that the reflective layer is adhered with the second surface; and irradiating a reproducing reference beam onto the first surface of the holographic recording medium and reading a signal beam which is reflected at the reflective layer and reproduced from the holographic recording medium.

The present invention also relates to a holographic read only recording medium configured such that a reproduced signal beam is obtained by irradiating a reproducing reference beam to an information as an interference pattern recorded through irradiation of a recording signal beam and a recording reference beam, including a reflective layer so as to be adhered with, of the holographic recording medium, a side opposite to a side of irradiation of the recording reference beam, the recording reference beam and the reproducing reference beam.

According to the present invention, after the recording signal beam and the recording reference beam are irradiated onto the holographic recording medium so as to form holograms (or gratings) and thus implement the recording process, the reflective layer is formed on the surface of the holographic recording medium so as to be adhered therewith, the surface being opposite to the surface thereof onto which the recording signal beam and the recording reference beam are irradiated and the reproducing reference beam is irradiated so as to obtain the corresponding reproduced signal beam.

In this case, since the reflective layer is provided so as to be adhered with the holographic recording medium, the incident position of the reproducing reference signal is unlikely to be shifted from the inherent incident position of the reproducing reference signal relative to the holographic recorded area. Namely, since the reproducing reference beam can be irradiated onto or in the vicinity of the holographic recorded area, no compensation mechanism for compensating the incident position of the reproducing reference beam is required.

In the Patent document No. 1, moreover, since the reflective layer is provided with being away from the holographic recording medium, the reproducing reference beam is refracted and scattered due to the difference in refractive index between the layer of air and the holographic recording medium so that the intended holographic reproducing may not be implemented under good condition if the surface of the holographic recording medium is rough.

In the present invention, in contrast, the roughness of the surface of the holographic recording medium can be embedded and cancelled by the reflective layer or the adhesive agent as will be described below even though the surface of the holographic recording medium is rough. Generally, since the difference in refractive index between the holographic recording medium and the reflective layer or the adhesive agent is small, the refractive index difference is substantially set off by the embedding of the roughness of the surface of the holographic recording medium. As a result, an intended holographic reproducing can be implemented under the condition that the reproducing reference beam is not refracted and scattered even through the surface of the holographic recording medium is rough.

In the present invention, furthermore, since the reflective layer is not provided at the holographic recording, the unnecessary exposure and the formation of unnecessary interference for the holographic recording medium can be prevented so that the noise reduction and the recording multiplexing number can be enhanced.

In the present invention, in addition, since a reproduced signal with a high intensity can be obtained using the high reflectivity of the reflective layer at the holographic reproducing, high S/N ratio and high data transfer rate can be realized.

In an aspect of the present invention, the reflective layer may be adhered and joined with the second surface of the holographic recording medium via an adhesive agent. In this case, as described above, the intended holographic recording process can be implemented under the condition that the reproducing reference beam is not refracted and scattered due to the difference in refractive index between the holographic recording medium and the layer of air by embedding the evenness of the holographic recording medium while the reflective layer can be easily adhered and fixed with the holographic recording medium.

In another aspect of the present invention, the holographic recording medium may be provided on a transparent substrate such that the recording signal beam and the recording reference beam are irradiated onto the holographic recording medium from the side of the transparent substrate. In this case, even though the surface of the holographic recording medium is rough, the refractions and scatterings of the respective recording beams, resulting from the difference in refractive index between the layer of air and the holographic recording medium, can be prevented so that the holographic reproducing can be implemented under good condition.

In still another aspect of the present invention, the holographic recording medium may be provided between a transparent substrate and an anti-reflector such that the first surface is located in the side of the transparent substrate and the anti-reflector is removed after writing the information and before providing the reflective layer. In this case, the recording signal beam and the recording reference beam can be confined effectively and efficiently in the holographic recording medium at the holographic recording so that the holographic recording process can be implemented effectively and efficiently even though the intensities of the recording signal beam and the recording reference beam are relatively low. In addition, the holographic recording medium can be easily formed and the thickness of the holographic recording medium can be easily controlled.

In a further aspect of the present invention, the reflective layer is provided so as to be adhered with the second surface of the holographic recording medium with being maintained on a supporting substrate. In this case, since the reflective layer can be formed on the supporting substrate in advance, the joint of the reflective layer with the holographic recording medium can be easily implemented at any step in the manufacturing process of the holographic recording medium.

Advantageous Effect

According to the present invention can be easily provide a simply structured holographic recording medium which can prevent unnecessary exposure and the formation of unnecessary interference pattern in the holographic recording layer at recording, realize a large multiplexing number under the condition of low noise at recording, and implement the reproducing process at a high S/N ratio and a high data transfer rate.

MODE FOR CARRYING OUT THE INVENTION

Hereinafter, embodiments of the present invention will be described with reference to drawings.

(Overview of Holographic Recording/Reproducing)

First of all, the overview of the holographic recording/reproducing of the present invention will be described. FIGS. 1 to 4 are explanatory views showing the recording/reproducing steps according to an embodiment of the holographic recording and reproducing method of the present invention.

Figure 1:
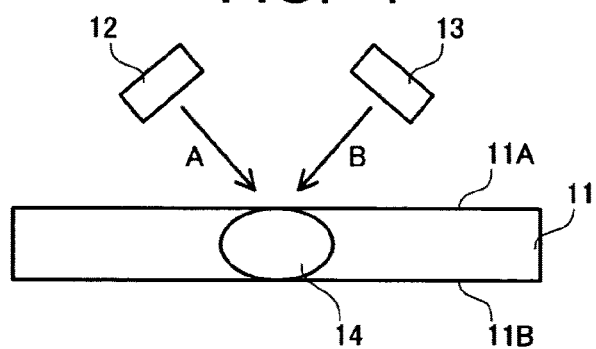
FIG. 1 is an explanatory view showing one step in recording/reproducing according to an embodiment of the holographic recording and reproducing method of the present invention.

As shown in FIG. 1, first of all, a holographic recording medium 11 is prepared and a first light source 12 and a second light source 13 are positioned above a first surface 11A of the holographic recording medium 11. Then, a recording signal beam A and a recording reference beam B are irradiated onto the holographic recording medium 11 from the first light source 12 and the second light source 13, respectively, to form a recorded area 14 where a given information is stored in a shape of interference pattern.

The holographic recording medium 11 may be made of, e.g. a material of which the optical constant such as refractive index, transmissivity, reflectivity, and/or polarization is changed in the optically bright fringes and dark fringes formed by the interference of the recording signal beam and the recording reference beam. As the material can be exemplified photopolymer, photorefractive crystal, photorefractive polymer, chalcogenide compound, photochromic material and thermochromic material.

Particularly not shown in this embodiment, the holographic recording medium 11 may be coated and formed on a flat and smooth (optical flat) substrate made of a transparent glass or plastic material as need arises. In this case, the side of the substrate may be set to the incident side of the recording signal beam A and the recording reference beam B or the side of the holographic recording medium 11 may be set to the incident side of the recording signal beam A and the recording reference beam B.

In the former case, even though the surface of the holographic recording medium 11 is rough, the refraction and scattering of the recording beams due to the difference in refractive index between the air and the holographic recording medium can be prevented to realize the holographic recording process under good condition.

Figure 2:
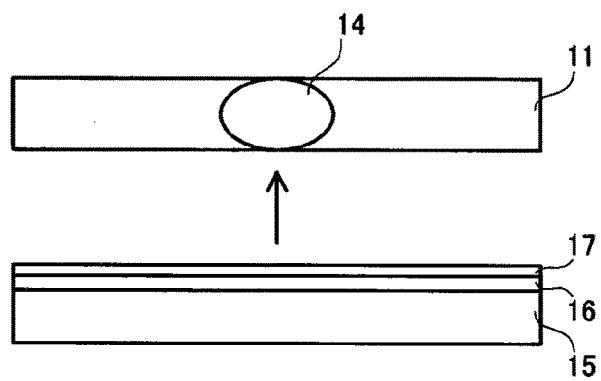
FIG. 2 is also an explanatory view showing one step in recording/reproducing according to an embodiment of the holographic recording and reproducing method of the present invention.

Then, as shown in FIG. 2, a supporting substrate 15 is prepared, and a reflective layer 16 is formed on the supporting substrate 15 by means of dry method such as vacuum evaporation or sputtering, wet method such as plating, or coating method such as spin coating. Then, an adhesive layer 17 is coated and formed on the reflective layer 16. Particularly not shown, a protective layer made of a transparent film or resin may be formed on the surface(s) of the reflective layer 16 in order to protect the surface(s) of the reflective layer 16.

Instead of the process as shown in FIG. 2, the adhesive layer 17 may be directly formed on the second surface 11B of the holographic recording medium 11, not on the reflective layer 16.

The reflective layer 16 is made of a material with a higher reflectivity preferably of 50% or more for a reproducing reference beam to be employed in the holographic reproducing process as will be described hereinafter. For example, a single metal such as Al, Ti, V, Cr, Mn, Fe, Co, Ni, Cu, Zn, Zr, Nb, Mo, Ag, In, Sn, Ta, W, Pd, Pt, Au, Pb and an alloy constituted from one or more of the single metals as listed above may be exemplified. Moreover, the reflective layer 16 may be formed of a wavelength selective multilayered film which is made of a plurality of layers with the respective reflectivity of 50% or more and the respective different refractive indexes. For example, the plurality of layers constituting the wavelength selective multilayered film can be appropriately selected from group consisting of $MgF_2$, $SiO_2$, $Al_2O_3$, $ZnS$, $TiO_2$, $Si_3N_4$, $Ta_2O_5$, $V_2O_5$, $ZnO$, $ZrO_2$, $Nb_2O_5$, $In_2O_3$, $SnO_2$, $WO_3$, and $PbO$. In this case, the layer composing the wavelength selective multilayered film may be made of a mixture of the compounds as listed above such as a ternary compound or quarterly compound.

The adhesive layer 17 is not restricted and thus may be appropriately made of an adhesive agent as occasion demands. For example, a UV cure adhesive agent, a one-component adhesive agent and a two-component adhesive agent, which are well known adhesive agents, may be exemplified. Therefore, one or more of the well known adhesive agents may be appropriately selected and combined with one another to form the adhesive agent of the adhesive layer 17. The adhesive layer 17 is preferably set within a range of ±0.1 in refractive index for the holographic recording medium 11, more preferably within a range of ±0.05 in refractive index for the holographic recording medium 11. More particularly, the adhesive layer 17 is made of the same material as the holographic recording medium 11.

Even though the surface of the holographic recording medium 11 is rough, the surface roughness of the holographic recording medium 11 is embedded by the adhesive layer 17. In this case, if the difference in refractive index of the holographic recording medium 11 and the adhesive layer 17 is maintained small as described above, the difference in refractive index can be substantially set off. Therefore, even though the surface of the holographic recording medium 11 is rough, the reproducing reference beam is not refracted and scattered so as to implement the holographic reproducing process under good condition.

Moreover, the thickness of the adhesive layer 17 is not restricted. However, the thickness of the adhesive layer 17 is preferably set within a range of 0.1 to 200 μm, more preferably within a range of 0.1 to 100 μm, much more preferably within a range of 0.1 to 10 μm in order to suppress the shift between the incident position of the reproducing reference beam and the inherent incident position thereof for the holographic recording medium.

Figure 3:
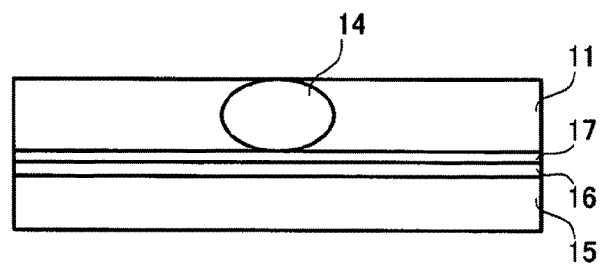
FIG. 3 is also an explanatory view showing one step in recording/reproducing according to an embodiment of the holographic recording and reproducing method of the present invention.

Then, the second surface 11B opposite to the first surface 11A of the holographic recording medium 11 is joined and adhered with the adhesive layer 17 to form a holographic read only recording medium as shown in FIG. 3. It is effective that the adhesion process is implemented under a depressurized atmosphere in order to prevent the interfusion of air bubble.

Figure 4:
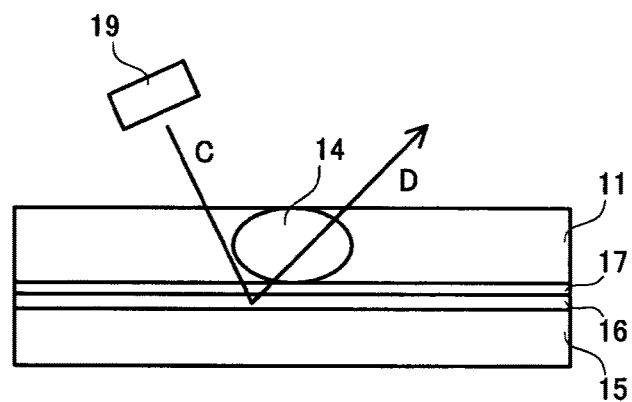
FIG. 4 is also an explanatory view showing one step in recording/reproducing according to an embodiment of the holographic recording and reproducing method of the present invention.

As shown in FIG. 4, a third light source 19 is positioned above the first surface 11A of the holographic recording medium 11 so that a reproducing reference beam C is irradiated onto the recorded area 14 of the holographic recording medium 11 from the third light source 19 and reflected by the reflective layer 16 to obtain a reproduced signal beam D.

Through the aforementioned processes, the recording/reproducing can be implemented for the holographic recording medium 11.

According to the recording and reproducing method of the holographic recording medium of this embodiment, after the recording signal beam A and the recording reference beam B are irradiated onto the holographic recording medium 11 from the side of the first surface 11A thereof to form holograms (or gratings) (recorded area 14) and thus implement the recording process, the reflective layer 16 is provided on and adhered with the second surface 11B opposite to the first surface 11A of the holographic recording medium 11 so that the reproducing reference beam C is irradiated to obtain the reproduced signal beam D.

In this case, since the reflective layer 16 is provided on and adhered with the holographic recording medium, the incident position of the reproducing reference beam C is unlikely to be shifted from the inherent incident position of the reproducing reference beam C for the recorded area 14. Namely, since the reproducing reference beam C can be irradiated onto or in the vicinity of the recorded area 14, a compensation mechanism for compensating the incident position of the reproducing reference beam C is not required.

In this embodiment, moreover, since the reflective layer 16 does not exist at the recording process, the unnecessary exposure and the formation of unnecessary noise holograms/gratings can be prevented for the holographic recording medium so as to reduce noise and develop multiplexing number.

Since a higher reproducing output can be obtained using a higher reflectivity of the reflective layer at reproducing process, a higher S/N ratio and a higher date transfer rate can be realized.

As described above, since the surface roughness of the holographic recording medium 11 is embedded by the adhesive layer 17 even though the surface of the holographic recording medium 11 is rough while the difference in refractive index between the holographic recording medium 11 and the adhesive layer 17 is set off, the holographic reproducing process can be implemented under good condition without the refraction and scattering of the reproducing reference beam.

In this embodiment, the supporting substrate 15 is prepared, and a supporter made of the supporting substrate 15 and the reflective layer 16 formed on the supporting substrate 15 is formed so that the supporter is contacted and joined with the holographic recording medium 11. In this case, since the reflective layer 16 is formed on the supporting substrate 15 in advance, the supporting substrate 15 can be easily joined with the holographic recording medium 11 at any step in the manufacturing process of the holographic read only recording medium.

The reflective layer 16 can be formed directly on the second surface 11B of the holographic recording medium 11 by means of sputtering not using the supporting substrate 15 as described above.

Moreover, a protective layer made of a hard coating material may be formed on the reflective layer 16 so as to ensure the strength and stiffness thereof, prevent scratch thereof and implement corrosion-resistant treatment thereof.

Figure 5:
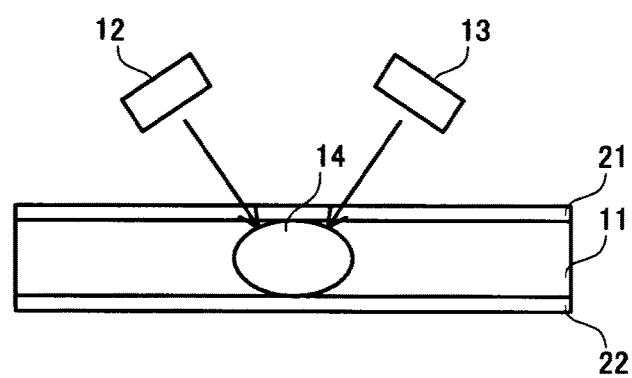
FIG. 5 is an explanatory view showing one step in recording/reproducing according to a modified embodiment of the holographic recording and reproducing method relating to FIGS. 1 to 4.

FIG. 5 is an explanatory view relating to a modified embodiment of the holographic recording and reproducing method as described previously. In FIG. 5, the holographic recording medium 11 is sandwiched between a transparent substrate 21 and anti-reflector 22.

The transparent substrate 21 is made of a glass material or resin material of which the surface is rendered flat and smooth. An antireflective film is preferably formed on the transparent substrate 21 as occasion demands. In this case, the reflectivity at the interface between the antireflective film and a layer of air is preferably set to 1% or less.

The anti-reflector 22 may be made of a film, a polarizing plate, a polarizing film, a light absorption plate, a light absorption film, or a antireflective film. When the polarizing plate or polarizing film is employed, the polarization direction thereof is set orthogonal (about 90 degrees) to the polarization direction of the recording signal beam A and the recording reference beam B at holographic recording.

Moreover, since the anti-reflector 22 is removed after the holographic recording process, it is preferable that a surface lubricant is provided so as to easily remove the anti-reflector 22.

In this embodiment, the recording signal beam A and the recording signal beam B can be effectively and efficiently confined in the holographic recording medium 11 at holographic recording so that the intended holographic recording process can be effectively and efficiently implemented even though the intensities of the recording reference beam A and the recording reference beam B are relatively low. Moreover, the holographic recording medium can be easily formed and the thickness of the holographic recording medium 11 can be easily controlled.

The joint between the holographic recording medium 11 and the reflective layer 16 as shown in FIG. 3 is implemented after the anti-reflector 22 is removed when the anti-reflector 22 has light absorption for the reproducing reference beam, and thereafter, the reproducing process is implemented as shown in FIG. 4. In this embodiment, therefore, the aforementioned effect/function can be exhibited at holographic reproducing.

When the anti-reflector 22 is made of a film such as a light absorption film or antireflective film, the film is formed on a transparent substrate (on a surface thereof in the side opposite to the holographic recording medium), e.g., with a thickness of 200 μm or less.

Here, the transparent substrate 21 may be appropriately omitted.

(Concrete Embodiment of Holographic Recording/Reproducing)

Figure 6:
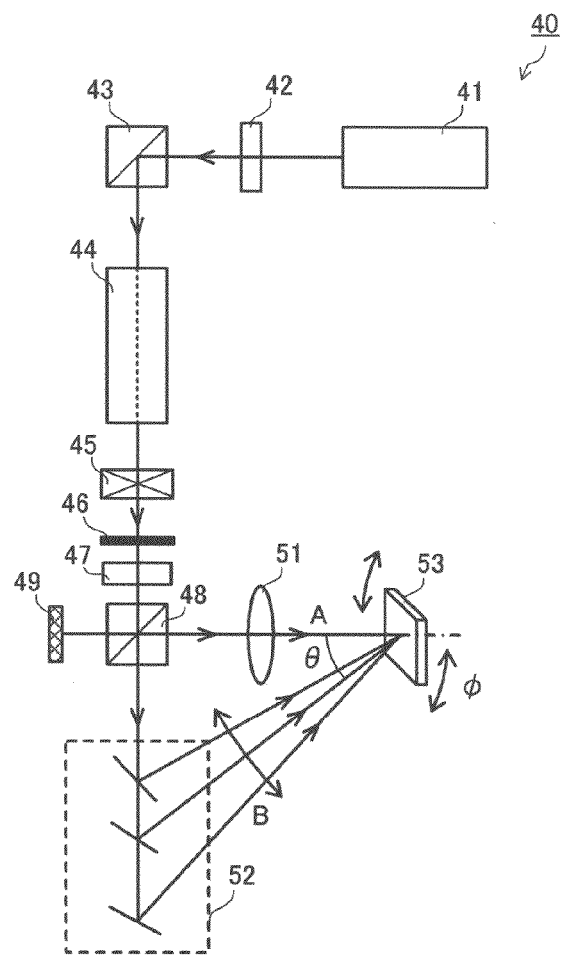
FIG. 6 is a schematically structural view showing an embodiment of an optical device for implementing the holographic recording process.

FIG. 6 is a schematically structural view showing an embodiment of an optical device for implementing the holographic recording process. As shown in FIG. 6, the optical device 40 in this embodiment includes a laser 41 and also includes a half-wave plate (hereinafter, called as a "HWP") 42, a polarization beam splitter 43, a beam expander 44, a shutter 45, a diaphram 46, an HWP 47, a polarization beam splitter 48 and a spatial light modulator 49 which are subsequently arranged along the optical path thereof. Then, a condensing lens 51 is provided in the side opposite to spatial light modulator 49 relative to the polarization beam splitter 48, and an angle scanning mechanism 52 is provided below the polarization beam splitter 48.

The holographic recording medium 53 is disposed in front of the condensing lens 51 and configured as shown in FIG. 1 or 5 at holographic recording. The holographic recording medium 53 is attached on a rotating stage (not shown) which is rotated in a vertical direction ($\phi$).

The laser 41 may be constituted from a laser diode, for example. The HWP 42 functions as controlling the power of beam over the optical system of the optical device 40 and the HWP 47 functions as controlling the power ratio of signal beam and reference beam. The spatial light modulator 49 modulates the laser beam into a bright and dark dot-pattern to form the recording signal beam A. The angle scanning mechanism 52 changes the incident angle θ of the recording reference beam B so as to realize a multiplexing recording based on two-beam interference method.

Figure 7:
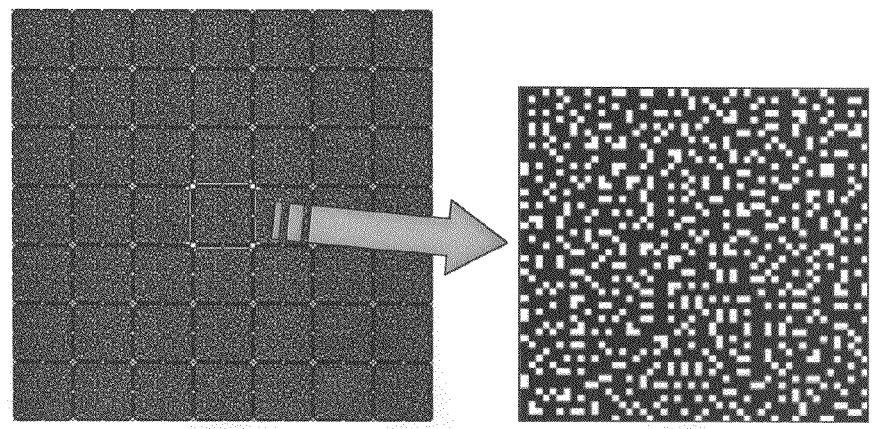
FIG. 7 is a view showing an embodiment of dot pattern to be displayed at the spatial light modulator of the optical device shown in FIG. 6.

FIG. 7 is a view showing an embodiment of dot pattern to be displayed at the spatial light modulator 49. In the left side of FIG. 7, a plurality of masses, each having 50×50 dots, are arranged in a matrix of 7×7 to form the dot pattern of 122.5 k bits per page. In the right side of FIG. 7, the center mass with 50×50 dots is enlarged.

The laser beam emitted from the laser 41 is controlled in power at the HWP 42, reflected downward at the polarization beam splitter 43, and enlarged in beam diameter at the beam expander 44. Thereafter, the holographic recording medium 53 is rendered under exposure by opening the shutter 45. Then, the beam diameter of the laser beam is narrowed at the diaphragm 46, and the laser beam is divided at the polarization beam splitter 48. One division laser beam is introduced into the spatial light modulator 49 so as to superimpose the signal of dot pattern as shown in FIG. 7 thereto to form the recording signal beam A. The recording signal beam A is condensed at the condensing lens 51, and irradiated onto the area to be recorded of the holographic recording medium 53.

The other division laser beam obtained at the polarization beam splitter 48 is introduced into the angle scanning mechanism 52, scanned by a predetermined angle and irradiated onto the area to be recorded of the holographic recording medium 53 by an angle of θ.

The angles θ and φ are set to respective predetermined angles while a first page signal is displayed at the spatial light modulator 49 so that the holographic recording medium 53 is exposed by opening the shutter 45 and the first page signal is recorded into the holographic recording medium 53. Then, the angles θ and φ are set to respective next predetermined angles while a second page signal is displayed at the spatial light modulator 49 so that the holographic recording medium 53 is exposed by opening the shutter 45 and the second page signal is recorded into the holographic recording medium 53. The aforementioned process is repeated until the holographic recording medium 53 is recorded at a predetermined multiplexing number. The holographic recording medium 53 is shifted to a next predetermined position such that the recording signal beam and the recording reference beam can be irradiated onto a portion of the holographic recording medium 53 and the aforementioned process is repeated.

After holographic recording, post exposure (fixing treatment) is implemented so as to polymerize the monomers remaining in the holographic recording medium and stabilize the holographic recording medium as need arises when particularly, the holographic recording medium is made of a photopolymer. In the reproducing process as will described below, when the reflective layer is joined with the holographic recording medium via an adhesive agent made of UV cure resin, the full exposure can be omitted.

Figure 8:
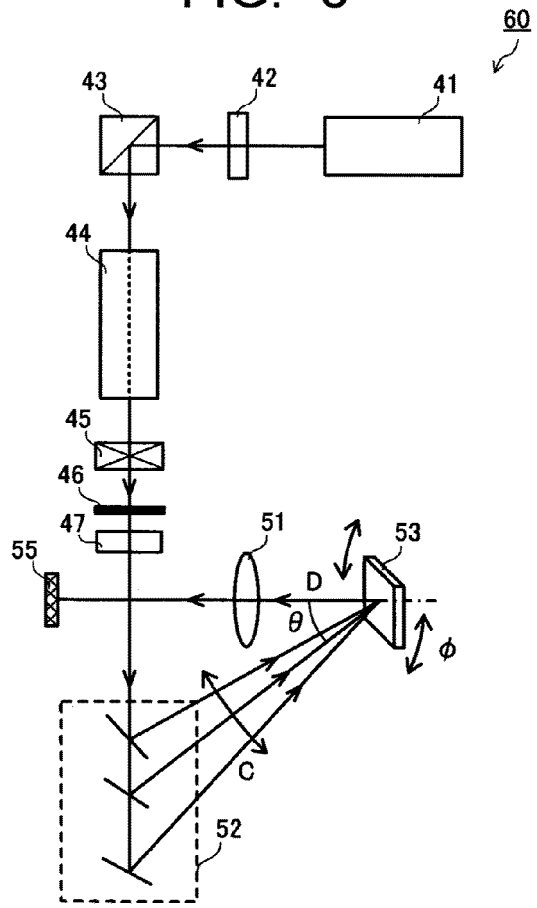
FIG. 8 is a schematically structural view showing an embodiment of an optical device for implementing the holographic reproducing process.

FIG. 8 is a schematically structural view showing an embodiment of an optical device for implementing the holographic reproducing process. The optical device 60 shown in FIG. 8 is configured such that the HWP 47, the polarization beam splitter 48 and the spatial light modulator 49 are detached from the optical device 40 shown in FIG. 6 and instead an image sensor 55 such as a CMOS or a CCD is disposed at the position of the spatial light modulator 49. In this case, since the holographic reproducing process is implemented, the holographic recording medium 53 is configured such that the reflective layer is joined therewith as shown in FIG. 3, for example.

At holographic reproducing, therefore, the laser beam emitted from the laser 41 is introduced into the angle scanning mechanism 52 via the HWP 42, the polarization beam splitter 43, and the beam expander 44 while the shutter 45 is opened, and then irradiated onto the holographic recording medium 53 as the reproducing reference beam C. In this case, the angles θ and φ are set to the respective predetermined angles corresponding to a given pages (desired to be reproduced) and the reproducing reference beam C is irradiated onto the holographic recording medium 53 so as to be exposed and to obtain the reference signal beam D. The reference signal beam D is processed at the image sensor 55 to be converted into the corresponding reproduced image. A signal processing is conducted for the reference signal beam D as occasion demand so as to obtain the corresponding reproduced signal.

The optical system of the optical device 60 is preferably constituted as an optical system of phase conjugate reproduction. Namely, the reproducing reference beam is preferably a phase conjugate beam relative to the recording signal beam and the recording reference beam. In this case, optical distortions such as lens aberration are cancelled at holographic reproducing to obtain the reproduced signal with low distortion. The phase conjugate reproduction can be realized by shifting the angle φ from the angle at holographic recording by 180 degrees.

EXAMPLE

Experiment 1

The holographic recording medium was made of a photopolymer compound. The photopolymer compound was made by blending the following compounds under nitrogen atmosphere.

Hexamethylene diisocyanate (made by TOKYO CHEMICAL INDUSTRY CO., LTD) (refractive index $n_D$=1.453): 30.8 parts by weight, polyether triol (made by ADEKA CORPORATION, G-400, average molecular weight=409) (refractive index $n_D$=1.469): 48.1 parts by weight, adduct of 9,9-bis (4-hydroxyphenyl)fluorene diglycidyl ether containing acrylic acid (made by Nippon Steel Chemical Co., Ltd., ASF-400) (refractive index $n_D$=1.616): 4.0 parts by weight, dibutyltin dilaurate (made by TOKYO CHEMICAL INDUSTRY CO., LTD): 0.03 parts by weight, bis(η5-2,4-cyclopentadiene-1-yl)-bis(2,6-difluoro-3-(1H-pyrol-1-yl)-phenyl)titanium (made by Ciba Specialty Chemicals, IRGACURE 784): 1.2 parts by weight, acenaphthylene (made by Nippon Steel Chemical Co., Ltd.) (refractive index $n_D$=1.678): 4.0 parts by weight, o-acetyl tributyl citric acid (made by TOKYO CHEMICAL INDUSTRY CO., LTD) (refractive index $n_D$=1.441): 11.8 parts by weight. Therefore, the refractive index $n_D$ of the photopolymer compound was 1.475.

Then, the photopolymer compound was introduced into the gap between a glass substrate (B270) with a refractive index $n_D$ of about 1.523 and a thickness of 0.5 mm and a polyethylene terephthalate (PET, n=1.57) film with a surface lubricant on the inner surface. The thickness of the photopolymer compound was set to 700 μm with a silicone film spacer placed between them. The thus obtained laminated body was maintained one night at room temperature, and then heated at 60° C. for 5 hours under nitrogen atmosphere, thereby forming an intended holographic recording medium. In this case, the planarity of the holographic recording medium was maintained by applying tensile force to the ends thereof such that the PET film was not deformed by the tensile stress of the recording material thereof. The thermal treatment was conducted so as to ensure the polymerization of the matrix of the holographic recording medium. Therefore, if the polymerization of the matrix proceeded sufficiently before the thermal treatment, the thermal treatment may be omitted.

Then, a black paint was coated on the rear surface of the PET film for antireflection. When an optical beam with a wavelength of 532 nm was incident from the side of the recording material, the reflectivity at the surface of the PET film was about 2%. Since the black paint was coated for antireflection, the black paint was not required if a film with light absorption or antireflection was used.

Then, the recording/reproducing process for the holographic recording medium will be exemplified. The holographic recording was implemented from the side of the substrate of the holographic recording medium by using the optical device 40 shown in FIG. 6 under the condition that the dot pattern shown in FIG. 7 was displayed at the spatial light modulator 49 for the generation of the recording signal beam.

Then, a predetermined multiple recording was conducted under the condition of a multiplexing number of 16×15=240 by varying the angle θ from 51 degrees to 66 degrees per 1 degree (=a multiplexing number of 16) and varying the angle φ from 0 degree to 168 degrees per 12 degrees (=a multiplexing number of 15) and under the condition of a multiplexing number of 26×20=520 by varying the angle θ from 51 degrees to 66 degrees per 0.6 degree (=a multiplexing number of 26) and varying the angle φ from 0 degree to 171 degrees per 9 degrees (=a multiplexing number of 20). Here, the recording signal beam was incident from the side of the glass substrate so as to conduct the holographic recording.

After the holographic recording process, full exposure was conducted for the holographic recording medium by using a LED with a central wavelength of about 530 nm so as to fix the holographic recording medium. Then, the PET film was peeled off.

The adhesive agent was blended from the following compounds under the nitrogen atmosphere.

Hexamethylene diisocyanate (made by TOKYO CHEMICAL INDUSTRY CO., LTD) (refractive index $n_D$=1.453): 33.6 parts by weight, polyether triol (made by ADEKA CORPORATION, G-400, average molecular weight=409) (refractive index $n_D$=1.469): 52.7 parts by weight, adduct of 9,9-bis (4-hydroxyphenyl)fluorene diglycidyl ether with acrylic acid (made by Nippon Steel Chemical Co., Ltd., ASF-400) (refractive index $n_D$=1.616): 4.0 parts by weight, dibutyltin dilaurate (made by TOKYO CHEMICAL INDUSTRY CO., LTD): 0.03 parts by weight, naphthylene (made by Nippon Steel Chemical Co., Ltd.) (refractive index $n_D$=1.638): 4.0 parts by weight, tributyl o-acetylcitrate (made by TOKYO CHEMICAL INDUSTRY CO., LTD) (refractive index $n_D$=1.441): 4.5 parts by weight.

Therefore, the refractive index $n_D$ of the adhesive agent compound is about 1.475 equal to that of the recording material. In order that the adhesive agent is rendered transparent and never causes photo-polymerization reaction and that the refractive index of the adhesive agent is rendered equal to that of the recording material, the adhesive agent was made of the aforementioned compounds under the aforementioned weight ratio. However, only if the aforementioned conditions are satisfied, the kinds of compounds and the weight ratio thereof are not restricted.

Then, the adhesive agent was spin-coated in a thickness of 100 μm by means of spin coater on a supporting substrate with a reflective layer thereon of reflectivity of 87% relative to the light with a wavelength of 532 nm under the atmosphere of temperature of 25° C. and humidity of 40%, and then the supporting substrate was joined with the aforementioned substrate immediately in order to prevent the interfusion of air bubble. The thus obtained laminated body was maintained one night as it was, and heated at 60° C. for 5 hours, thereby forming an intended holographic recording medium with the reflective layer. The thermal treatment was conducted so as to ensure the polymerization of the matrix of the holographic recording medium. Therefore, if the polymerization of the matrix was proceeded sufficiently before the thermal treatment, the thermal treatment may be omitted.

In this case, even though the concave-convex portions are formed on the surface of the holographic recording medium by the transcription of the concave-convex portions of the PET film or the surface distortion portions are formed on the surface thereof by the polymerization shrinkage, the roughness of the surface of the holographic recording medium, resulting from the concave-convex portions and the surface distortion portions which are formed on the surface thereof, is rendered flat and smooth by the adhesive agent, thereby implementing the holographic reproducing process under good condition.

Then, the holographic reproducing was implemented for the last page (240-th page) of the holographic recording medium recorded by a multiplexing number of 240 using the holographic reproducing optical device 60 shown in FIG. 8. The laser of the optical device 60 was the same as the laser of the optical device 40. In order to implement the phase-conjugate reproducing, the angle φ was shifted from the one at holographic recording by 180 degrees.

Figure 9:
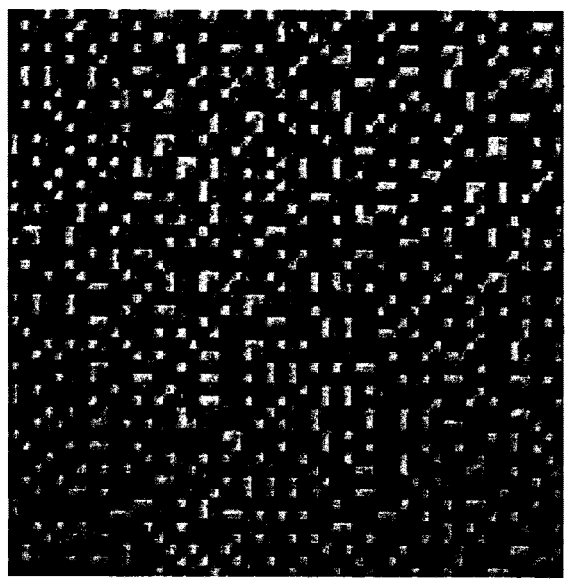
FIG. 9 is a view showing a reproduced image in Example.

FIG. 9 shows the enlarged center image of 50×50 bits in the reproduced image. It is turned out that the brightness contrast is fine and the recorded signal is reproduced under good condition.

Figure 10:
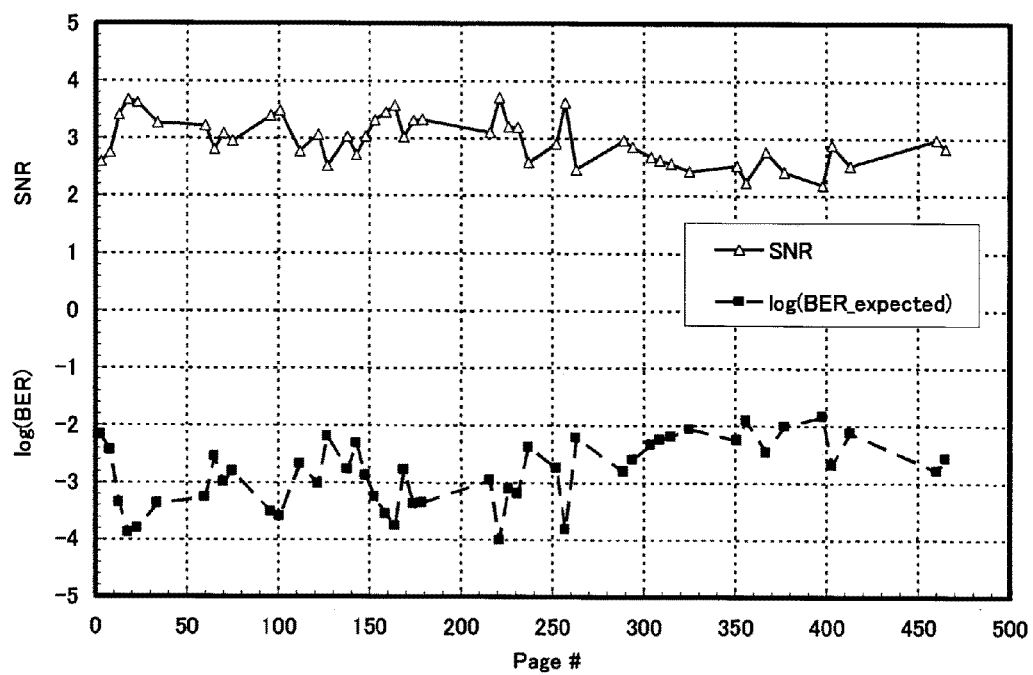
FIG. 10 is a graph showing the transitions of S/N ratio and BER (bit error rate) in Example.

FIG. 10 is a graph showing the transitions of S/N ratio and BER (bit error rate) in the reproduced image when the recording process was implemented at a multiplexing number of 520. The average S/N ratio and the average BER were 2.53 and $3.9 \times 10^{-3}$, respectively. The noise in the reproduced image is reduced because the reflective beam does not almost affect the recording process while the signal in the reproduced image is enhanced by the high reflectivity of the reflective layer at the reproducing process.

The S/N ratio was calculated by the same method as disclosed in Non-patent document No. 2. The BER was calculated as an expected value by statistically processing the reproduced image per pixel intensity.

Experiment 2

The recording material (photopolymer compound) of the holographic recording medium was blended in the same manner as in Experiment 1. Then, the photopolymer compound was introduced into the gap between glass substrates (B270) each with a refractive index $n_D$ of about 1.523 and a thickness of 0.5 mm such that the thickness of the photopolymer compound was set to 700 μm with a silicone film spacer placed between them. The thus obtained laminated body was maintained one night at room temperature and then heated at 60° C. for 5 hours under a nitrogen atmosphere, thereby forming an intended holographic recording medium.

Then, a black adhesive tape was coated on the rear surface of one of the glass substrates for antireflection. When an optical beam with a wavelength of 532 nm was incident from the side of the recording material, the reflectivity at the interface between the black adhesive tape and the corresponding glass substrate was about 1%. Since the black adhesive tape is applied on the glass substrate for antireflection, a paint with light absorption may be coated and removed after the holographic recording process so as to realize the antireflection.

Next, the recording process was implemented under the condition of a multiplexing number of 520 in the same manner as in Experiment 1. Here, the recording signal beam was incident from the side of the glass substrate so as to conduct the holographic recording. After the holographic recording process, full exposure was conducted for the holographic recording medium by using a LED with a central wavelength of about 530 nm so as to fix the holographic recording medium.

Then, the black adhesive tape was peeled off and an Ag film was formed in a thickness of about 50 nm by means of sputtering on the surface from which the black adhesive tape was peeled off. When the optical beam with a wavelength of 532 nm was incident from the side of the recording material, the reflectivity was about 50%.

When the recording process was implemented at a multiplexing number of 520, the average S/N ratio and the average BER were 3.30 and $1.6 \times 10^{-4}$, respectively, resulting from that the reflective beam does not almost affect the recording process to reduce the noise in the reproduced image and thus obtain such a higher S/N ratio and lower BER.

Experiment 3

The recording material (photopolymer compound) of the holographic recording medium was blended in the same manner as in Experiment 1. Then, the photopolymer compound was introduced into the gap between a glass substrate with a refractive index $n_D$ of about 1.487 and a thickness of 0.5 mm and a glass substrate with a thickness of 0.2 mm (OHARA S-FSL5) such that the thickness of the photopolymer compound was set to 700 μm with a silicone film spacer placed between them. The thus obtained laminated body was maintained one night at room temperature and then heated at 60° C. for 5 hours under a nitrogen atmosphere, thereby forming an intended holographic recording medium. The holographic recording medium was disposed such that the antireflective film was able to be positioned at the outside thereof. When an optical beam with a wavelength of 532 nm was incident from the side of the recording material, the reflectivity at the outer surface of the glass substrate with a thickness of 0.2 mm (on which the antireflective film was formed) was about 0.5%.

Next, the recording process was implemented under the condition of a multiplexing number of 520 in the same manner as in Experiment 1. Here, the recording signal beam was incident from the side of the glass substrate with a thickness of 0.5 mm so as to conduct the holographic recording.

After the holographic recording process, full exposure was conducted for the holographic recording medium by using a LED with a central wavelength of about 530 nm so as to fix the holographic recording medium.

Then, an Ag film was formed in a thickness of about 100 nm by means of sputtering on the outer surface of the glass substrate with a thickness of 0.2 mm on which the antireflective film was formed. When the optical beam with a wavelength of 532 nm was incident from the side of the recording material, the reflectivity was about 80%.

When the recording process was implemented at a multiplexing number of 520, the average S/N ratio and the average BER were developed to 4.34 and $2.3 \times 10^{-6}$, respectively, resulting from that the noise in the reproduced image is much reduced because the reflective beam does not much almost affect the recording process while the signal in the reproduced image is enhanced by the high reflectivity of the reflective layer at the reproducing process.

Experiment 4

An Ag total reflection layer, a ZnS—SiO$_2$ dielectric layer, a GeSbTe phase-change layer and a ZnS—SiO$_2$ dielectric layer were subsequently formed on a glass substrate so as to form a phase-change reflective layer thereon. The Ag total reflection layer and the GeSbTe phase-change layer were formed by means of DC sputtering and the ZnS—SiO$_2$ dielectric layers were formed by means of RF sputtering. Then, the photopolymer as a holographic recording layer was formed in a thickness of 0.8 mm on the phase-change reflective layer, thereby forming an intended holographic recording medium. In the initial stage, the phase-change reflective layer was rendered amorphous so that the reflectivity of the reflective layer was about 4%.

Next, the recording process was implemented under the condition of a multiplexing number of 240 in the same manner as in previous Experiments. After the holographic recording process, full exposure was conducted for the holographic recording medium by using a LED with a central wavelength of about 530 nm so as to fix the holographic recording medium.

Then, an initializer which was to be equipped in the manufacturing process of a phase-change type optical disc was prepared so as to crystallize the phase-change reflective layer. The reflectivity of the crystallized phase-change reflective layer was 27%.

Then, the holographic reproducing was implemented for the last page (240-th page) of the holographic recording medium recorded by a multiplexing number of 240 using the holographic reproducing optical device 60 shown in FIG. 8. In order to implement the phase-conjugate reproducing, the angle φ was shifted from the one at holographic recording by 180 degrees.

Figure 11:
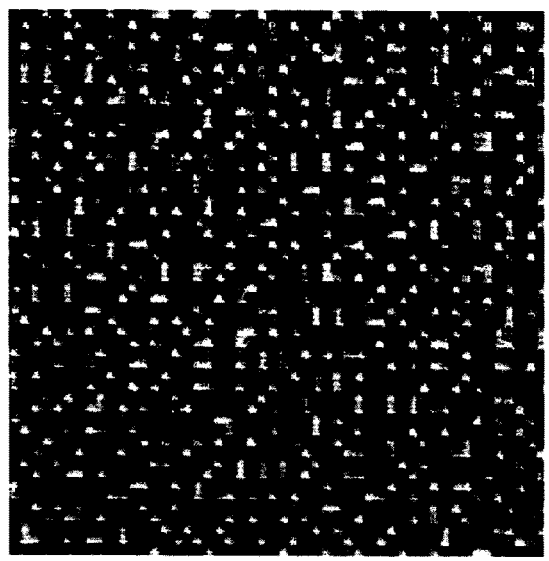
FIG. 11 is also a view showing a reproduced image in Example.

FIG. 11 shows the enlarged center image of 50×50 bits in the reproduced image. It is turned out that the brightness contrast is not fine and the recorded signal is not reproduced under good condition. Moreover, the S/N ratio is lowered because the reflective beam affects the recording process to increase the noise while the low reflectivity of the reflective layer affects the reproducing process to reduce the signal. Moreover, since the photopolymer is likely to be shrunk in volume at the polymerization thereof, the S/N may be lowered, originated from the warpage or the like of the reflective layer due to the volume shrinkage of the photopolymer.

Experiment 5

The recording material (photopolymer compound) of the holographic recording medium was blended in the same manner as in Experiment 1.

Then, after the PET film was peeled off, the recording process was implemented at a multiplexing number of 520 by irradiating the recording signal beam and the recording reference beam from the side of the holographic recording layer of the holographic recording medium, that is, the side opposite to the glass substrate thereof in the same manner as in previous Experiments. After the holographic recording process, full exposure was conducted for the holographic recording medium by using a LED with a central wavelength of about 530 nm so as to fix the holographic recording medium.

Then, a reflective layer was formed on the holographic recording layer of the holographic recording medium in the same manner as in previous Experiments. Then, the reproducing process was implemented by irradiating the reproducing reference beam from the side of the glass substrate, using the holographic reproducing optical system shown in FIG. 8. In order to implement the phase-conjugate reproducing, the angle φ was shifted from the one at holographic recording by 180 degrees.

Figure 12:
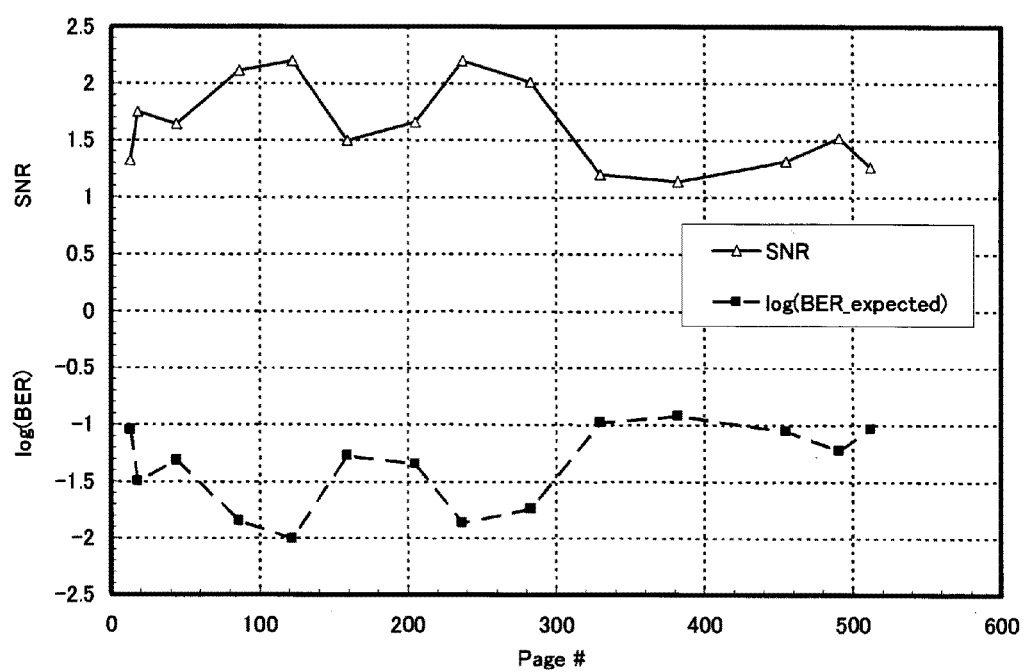
FIG. 12 is also a graph showing the transitions of S/N ratio and BER (bit error rate) in Example.

FIG. 12 is a graph showing the transitions of S/N ratio and BER (bit error rate) in the reproduced image when the recording process was implemented at a multiplexing number of 520. The average S/N ratio and the average BER were 1.59 and $4.6 \times 10^{-2}$, respectively.

Since the recording signal beam was irradiated from the side of the holographic recording layer of the holographic recording medium under the condition that the surface of the holographic recording layer was not flat and smooth, and thus rough, ununiform refraction might occur at the surface of the holographic recording layer so that the recording process was not able to be implemented under good condition, resulting in lower S/N ratio and higher BER in comparison with those in Experiment 1.

Although the present invention was described in detail with reference to the above examples, this invention is not limited to the above disclosure and every kind of variation and modification may be made without departing from the scope of the present invention.

EXPLANATION OF SYMBOLS

11 . . . holographic recording medium, 11A . . . first surface (of holographic recording medium), 11B . . . second surface (of holographic recording medium), 12 . . . first light source, 13 . . . second light source, 14 . . . recorded area of holographic recording medium, 15 . . . supporting substrate, 16 . . . reflective layer, 17 . . . adhesive layer, 19 . . . third light source

What is claimed is:

1. A method for recording and reproducing a holographic read only recording medium, comprising the steps of:
    irradiating a recording signal beam and a recording reference beam onto a first surface of a holographic recording medium to write an information as an interference pattern therein;
    providing a reflective layer on a second surface opposite to said first surface of said holographic recording medium such that said reflective layer is adhered with said second surface;
    irradiating a reproducing reference beam onto said first surface of said holographic recording medium and reading a signal beam which is reflected at said reflective layer and reproduced from said holographic recording medium;
    wherein said holographic recording medium is provided between a transparent substrate and an anti-reflector such that said first surface is located in a side of said transparent substrate and said anti-reflector is removed after writing said information and before providing said reflective layer,
    wherein said reflective layer is adhered and joined with said second surface of said holographic recording medium via an adhesive agent; and
    wherein a thickness of said adhesive agent is set within a range of 0.1 μm to 200 μm.

2. The recording and reproducing method as set forth in claim 1,
    wherein a refractive index of said adhesive agent is set within a range of ±0.1 relative to a refractive index of said holographic recording medium.

3. The recording and reproducing method as set forth in claim 2,
    wherein said adhesive agent is made of the same compound as said holographic recording medium.

4. The recording and reproducing method as set forth in claim 1,
    wherein said holographic recording medium is provided on a transparent substrate such that said recording signal beam and said recording reference beam are irradiated onto said holographic recording medium from a side of said transparent substrate.

5. The recording and reproducing method as set forth in claim 1,
    wherein said reflective layer is provided so as to be adhered with said second surface of said holographic recording medium while said reflective layer is formed on a supporting substrate.

6. A holographic read only recording medium configured such that a reproduced signal beam is obtained by irradiating a reproducing reference beam to an information as an interference pattern recorded through irradiation of a recording signal beam and a recording reference beam,
    wherein said holographic recording medium is provided between a transparent substrate and an anti-reflector such that a first surface is located in a side of said transparent substrate and said anti-reflector is removed after writing said information and before providing said reflective layer,
    wherein a reflective layer is adhered with a second surface opposite to said first surface via an adhesive agent with a thickness within a range of 0.1 μm to 200 μm.

7. The holographic recording medium as set forth in claim 6,
    wherein a refractive index of said adhesive agent is set within a range of ±0.1 relative to a refractive index of said holographic recording medium.

8. The holographic recording medium as set forth in claim 7,
    wherein said adhesive agent is made of the same compound as said holographic recording medium.

\* \* \* \* \*